United States Patent
Takagi et al.

(10) Patent No.: US 9,885,423 B2
(45) Date of Patent: Feb. 6, 2018

(54) CONTROL SYSTEM OF HYDRAULIC PRESSURE CONTROL VALVE

(71) Applicants: TOYOTA JIDOSHA KABUSHIKI KAISHA, Toyota-shi (JP); AISIN SEIKI KABUSHIKI KAISHA, Kariya-shi (JP)

(72) Inventors: Noboru Takagi, Toyota (JP); Satoru Onozawa, Anjo (JP); Yoshinobu Uchiyama, Toyota (JP)

(73) Assignees: TOYOTA JIDOSHA KABUSHIKI KAISHA, Toyota-shi (JP); AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/750,221

(22) Filed: Jun. 25, 2015

(65) Prior Publication Data

US 2015/0377375 A1 Dec. 31, 2015

(30) Foreign Application Priority Data

Jun. 27, 2014 (JP) .................................. 2014-132318

(51) Int. Cl.
*F16K 29/00* (2006.01)
*F16K 31/06* (2006.01)
*F01L 1/344* (2006.01)

(52) U.S. Cl.
CPC ............ *F16K 29/00* (2013.01); *F01L 1/3442* (2013.01); *F16K 31/0613* (2013.01);
(Continued)

(58) Field of Classification Search
CPC ....... F01L 1/34; F01L 2800/12; F01L 1/3442; F01L 2001/34426; F01L 2001/3443;
(Continued)

(56) References Cited

U.S. PATENT DOCUMENTS 5,186,204 A * 2/1993 Oka .................... F16H 61/0251
137/238
2002/0134335 A1 9/2002 Mae et al.
(Continued)

FOREIGN PATENT DOCUMENTS

JP 2000-303864 10/2000
JP 2002-030910 1/2002
(Continued)

*Primary Examiner* — Ian Paquette
(74) *Attorney, Agent, or Firm* — Oblon, McClelland, Maier & Neustadt, L.L.P.

(57) ABSTRACT

A control system includes a hydraulic pressure control valve and an electronic control unit. The hydraulic pressure control valve includes a spool configured to be moved inside a sleeve. The hydraulic pressure control valve is configured to control a hydraulic pressure by moving the spool between a first end and a second end of the sleeve. The hydraulic pressure control valve includes a stopper configured to transmit vibration to the sleeve. The electronic control unit is configured to control the spool to vibrate in the first end or the second end when foreign matter is stuck in the hydraulic pressure control valve, such that the spool or a member that moves the spool repeatedly hits the stopper.

8 Claims, 7 Drawing Sheets

(52) U.S. Cl.
CPC ............... *F01L 2001/3443* (2013.01); *F01L 2001/34426* (2013.01); *F01L 2001/34436* (2013.01); *F01L 2001/34443* (2013.01)

(58) Field of Classification Search
CPC .. F01L 2001/34443; F01L 2001/34436; F16K 31/0613; F16K 29/00; F16K 31/0675; F16K 37/0041
USPC .................................................. 137/625.65
See application file for complete search history.

(56) References Cited

U.S. PATENT DOCUMENTS

| | | | | |
|---|---|---|---|---|
| 2006/0086396 | A1* | 4/2006 | Ando | F16K 31/0613 137/625.65 |
| 2010/0101653 | A1* | 4/2010 | Ogata | F16H 61/12 137/2 |
| 2015/0027573 | A1* | 1/2015 | Ochiai | F01L 1/34 137/625.65 |

FOREIGN PATENT DOCUMENTS

| | | |
|---|---|---|
| JP | 2012-031741 | 2/2012 |
| JP | 2013-024254 A | 2/2013 |

\* cited by examiner

FIG. 6

CONTROL SYSTEM OF HYDRAULIC PRESSURE CONTROL VALVE

INCORPORATION BY REFERENCE

The disclosure of Japanese Patent Application No. 2014-132318 filed on Jun. 27, 2014 including the specification, drawings and abstract is incorporated herein by reference in its entirety.

BACKGROUND OF THE INVENTION

1. Field of the Invention

The present invention relates to a control system of a hydraulic pressure control valve.

2. Description of Related Art

There has been conventionally known a hydraulic pressure control valve including a spool that moves in a sleeve (for example, see Japanese Patent Application Publication No. 2012-31741 (JP 2012-31741 A)). The hydraulic pressure control valve is provided with a return spring for biasing the spool to one side, and an electromagnetic solenoid for driving the spool to the other side. The hydraulic pressure control valve is configured such that its hydraulic pressure is controlled by the spool being moved in the sleeve according to a current supplied to the electromagnetic solenoid.

Here, in such a hydraulic pressure control valve, foreign matter mixed in oil may be stuck on the spool. When the foreign matter is stuck on the spool as such, the spool malfunctions, which makes it difficult to control the hydraulic pressure appropriately. In view of this, in the hydraulic pressure control valve of JP 2012-31741 A, when foreign matter is stuck, the spool is forcibly reciprocated, so as to remove the foreign matter thus stuck. Note that the reciprocation of the spool is performed so that the spool comes and goes repeatedly between one end and the other end of the sleeve so as to crush the foreign matter.

However, in such a conventional hydraulic pressure control valve, it is possible to remove foreign matter that can be crushed, but it is difficult to remove foreign matter that cannot be crushed.

SUMMARY OF THE INVENTION

The present invention provides a control system of a hydraulic pressure control valve which control system can remove foreign matter stuck on the hydraulic pressure control valve, even if the foreign matter cannot be crushed.

A control system related to the present invention includes a hydraulic pressure control valve and an electronic control unit. The hydraulic pressure control valve includes a spool configured to be moved inside a sleeve. The hydraulic pressure control valve is configured to control a hydraulic pressure by moving the spool between a first end and a second end of the sleeve. The hydraulic pressure control valve includes a stopper configured to transmit vibration to the sleeve. The electronic control unit is configured to control the spool to vibrate in the first end or the second end when foreign matter is stuck in the hydraulic pressure control valve, such that the spool or a member that moves the spool repeatedly hits the stopper.

With such a configuration, when the foreign matter is stuck, the spool vibrates, so that the spool or the member that moves the spool repeatedly collides with the same stopper. Consequently, the vibration of the spool is transmitted to the sleeve, so that the foreign matter in the hydraulic pressure control valve can be shaken off from a part to which the foreign matter is attached. The foreign matter is then discharged with the oil. Thus, the foreign matter can be removed even if the foreign matter cannot be crushed.

That is, according to the control system of the hydraulic pressure control valve of the present invention, in a case where the foreign matter in the hydraulic pressure control valve is stuck, even if the foreign matter cannot be crushed, it is possible to remove the foreign matter.

The electronic control unit may be configured to control the spool such that the spool vibrates alternately in the first end and in the second end, when the foreign matter is stuck in the hydraulic pressure control valve.

According to such a configuration, at the time when the spool moves to the first end side, if the foreign matter is stuck and the spool cannot move to the first end, the spool can be vibrated in the second end, and in the meantime, at the time when the spool moves to the second end side, if the foreign matter is stuck and the spool cannot move to the second end, the spool can be vibrated in the first end. Hereby, regardless of a moving direction of the spool at the time when the foreign matter is stuck, the foreign matter can be shaken off.

The hydraulic pressure control valve may include a biasing member and a solenoid. The biasing member is configured to bias the spool toward first end side. The solenoid is configured to move the spool toward the second end side against a biasing force of the biasing member. The electronic control unit may be configured to control the spool to vibrate by adjusting a current application time to the solenoid.

With such a configuration, it is possible to easily vibrate the spool in the first end or in the second end.

The electronic control unit may be configured to control a pump capacity of a variable-capacity oil pump by controlling the hydraulic pressure control valve. The electronic control unit may be configured to determine whether the foreign matter is stuck or not, based on a target discharge hydraulic pressure of the variable-capacity oil pump and an actual discharge hydraulic pressure actually discharged from the variable-capacity oil pump.

According to such a configuration, it is possible to restrain such a problem that the pump capacity of the variable-capacity oil pump cannot be controlled due to the foreign matter being stuck.

The biasing member may be a spring.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the present invention is described below with reference to the drawings. Note that the present embodiment deals with a case where the present invention is applied to an ECU 100 for controlling an engine 1 to be provided in a vehicle.

Figure 1:
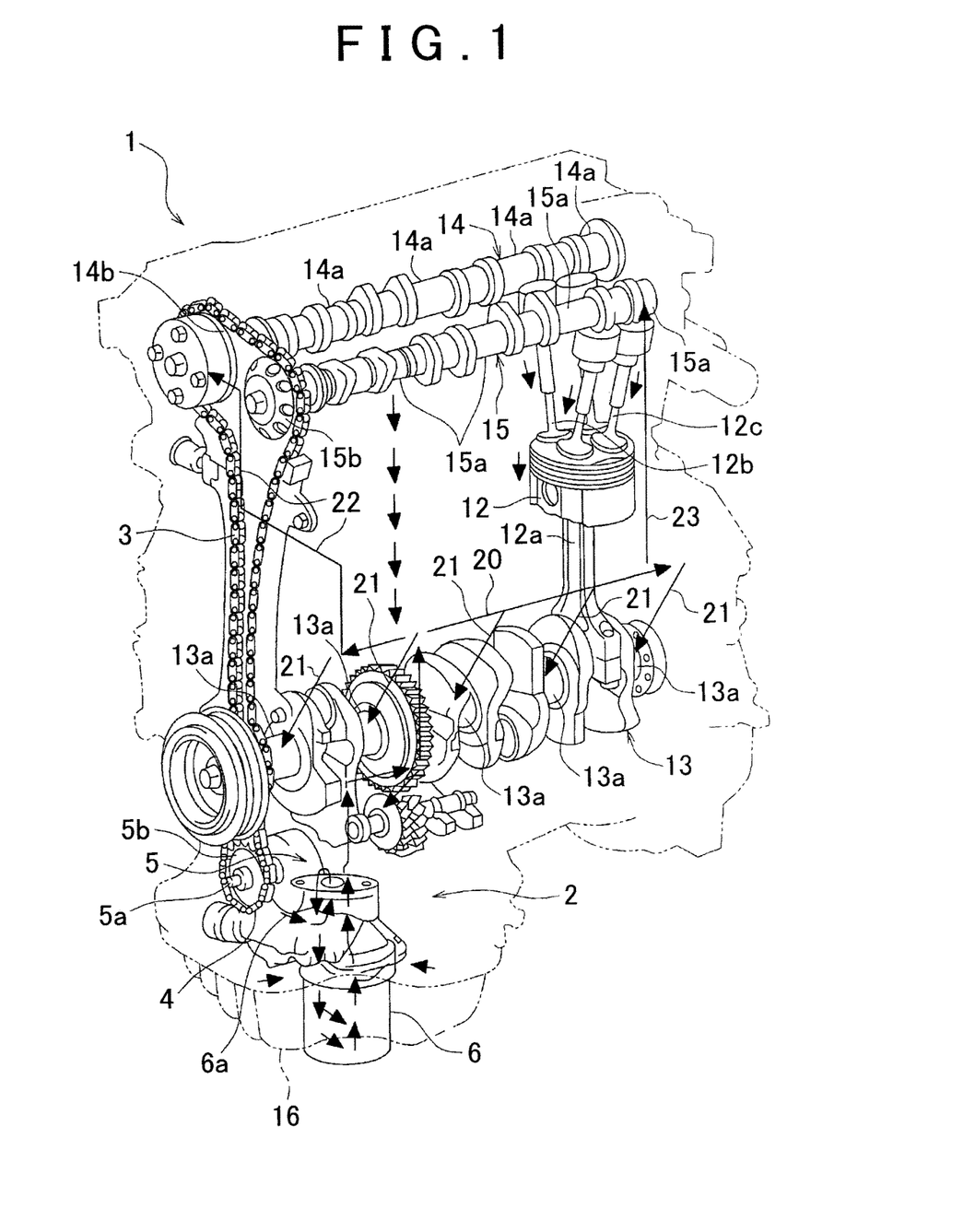
FIG. 1 is a schematic configuration diagram illustrating an example of an engine controlled by an ECU according to one embodiment of the present invention.

First, referring to FIG. 1, a schematic configuration of the engine 1 is described. Note that, in FIG. 1, an outer shape of the engine 1 is indicated by a virtual line.

The engine 1 is an in-line four-cylinder gasoline engine provided with four cylinders (not shown) in a longitudinal direction (hereinafter referred to as a front-rear direction) of a crankshaft 13, for example. A piston 12 (only one piston 12 is illustrated in the figure) is accommodated in each of the cylinders, and is connected to the crankshaft 13 via a connecting rod 12a. The crankshaft 13 is rotatably supported in a lower part (a crank case) of the engine 1 by a plurality of crank journals 13a.

Further, camshafts 14, 15 of a valve train system for driving an intake valve 12b and an exhaust valve 12c of each of the cylinders are disposed in an upper part of the engine 1. As an example, the valve train system is a DOHC type, in which the camshaft 14 on an intake side is rotatably supported by a plurality of cam journals 14a, and the camshaft 15 on an exhaust side is rotatably supported by a plurality of cam journals 15a.

Respective cam sprocket 14b, 15b are attached to front ends (left ends in FIG. 1) of the camshafts 14, 15, and a crank sprocket (not shown) is attached to a front end of the crankshaft 13. Further, a timing chain 3 is wound around the crank sprocket, and the cam sprockets 14b, 15b.

A sprocket (not shown) for driving an oil pump 5 is also attached to the crankshaft 13 so as to be adjacent to a rear side of the crank sprocket. The oil pump 5 is disposed below the front end of the crankshaft 13, and a pump sprocket 5b is attached to an input shaft 5a of the oil pump 5. Further, a chain 4 is wound around the pump sprocket 5b and the sprocket of the crankshaft 13.

According to such a configuration, a rotation of the crankshaft 13 is transmitted to the input shaft 5a via the chain 4 and the like, so that the oil pump 5 is operated. Due to the operation of the oil pump 5, engine oil (hereinafter just referred to as the oil) accumulated in an oil pan 16 in a lower part of the engine 1 is sucked up through an oil strainer (not shown), and then discharged from the oil pump 5 to a discharge oil passage 6a.

The oil thus discharged from the oil pump 5 flows through the discharge oil passage 6a and reaches an oil filter 6, in which foreign matter, impurity, etc. are filtered. Then, the oil flows into a main gallery 20 of an oil supply system 2. The main gallery 20 extends in a front-rear direction of the engine 1 in an example in FIG. 1, and distributes the oil between a plurality of branched oil passages 21 to 23. For example, the oil is supplied to the crank journal 13a by a plurality of branched oil passages 21 extending downward from the main gallery 20. Further, the oil is supplied to the cam journals 14a, 15a and so on by the branched oil passages 22, 23 extending upward from both ends of the main gallery 20.

Figure 2:
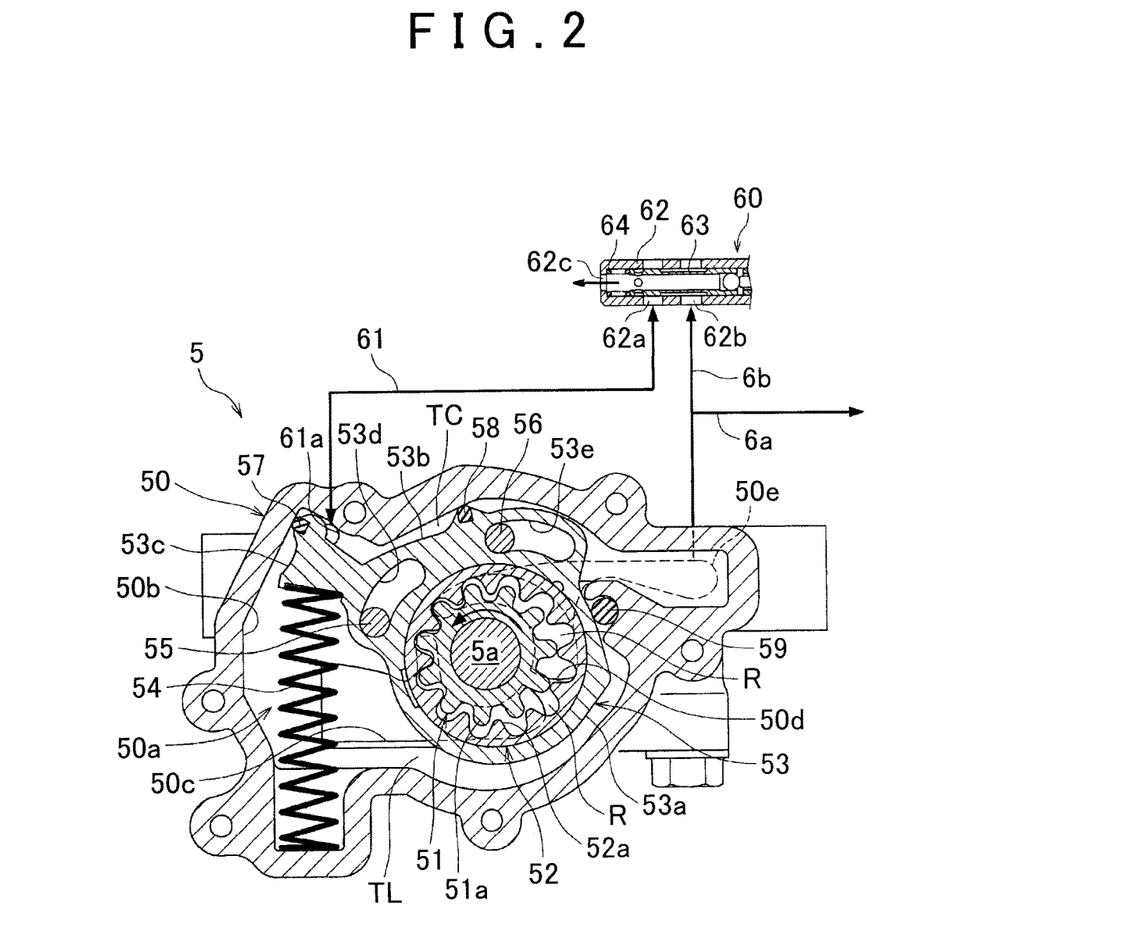
FIG. 2 is a sectional view illustrating a state where a pump capacity of an oil pump of an engine is maximum.
Figure 3:
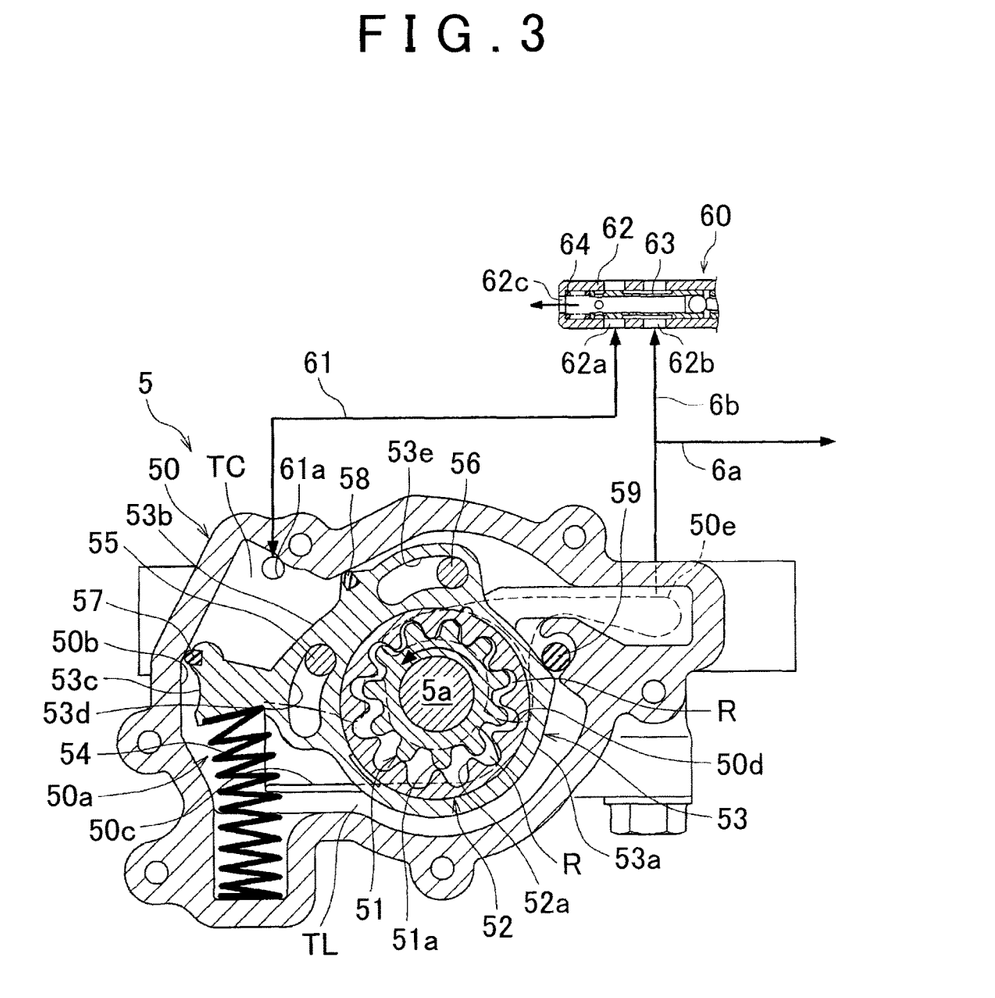
FIG. 3 is a sectional view illustrating a state where the pump capacity of the oil pump of the engine is minimum.

Referring now to FIGS. 2 and 3, the oil pump 5 is described below. The oil pump 5 is an internal gear pump, for example, and includes a drive rotor 51 as an external gear rotated by the input shaft 5a, and a driven rotor 52 as an internal gear meshing with this and rotated accordingly. An outer periphery of the driven rotor 52 is held by an adjustment ring 53.

A housing 50 of the oil pump 5 is provided with a receptacle portion 50a for receiving the drive rotor 51, the driven rotor 52, the adjustment ring 53, and the like. The receptacle portion 50a is constituted by a recessed portion 50b formed in the housing 50, and a cover (not shown) provided to close an open end of the recessed portion 50b. A through hole (not shown) is formed in the recessed portion 50b, and the input shaft 5a is passed through the through hole. The drive rotor 51 is attached to the input shall 5a.

An outer periphery of the drive rotor 51 is provided with a plurality of external teeth 51a having a trochoid curved line or a curved line (e.g., involute, cycloid, or the like) similar to the trochoid curved line. In the meantime, the driven rotor 52 is formed in a ring shape, and an inner periphery thereof is provided with a plurality of internal teeth 52a meshing with the external teeth 51a of the drive rotor 51. In the present embodiment, the number of external teeth 51a is 11, and the number of internal teeth 52a is 12, which is larger by one than the number of external teeth 51a.

Further, a center of the driven rotor 52 is eccentric relative to a center of the drive rotor 51 by a predetermined amount, and the external teeth 51a of the drive rotor 51 mesh with the internal teeth 52a of the driven rotor 52 on one side (on an upper left side in FIG. 2) in an eccentric direction that connects the centers.

A plurality of chambers R is formed so as to be aligned in a circumferential direction in a space between the drive rotor 51 and the driven rotor 52. Volumes of these chambers R increase and decrease while the chambers R move in the circumferential direction along with rotations of the drive rotor 51 and the driven rotor 52.

More specifically, the volumes of the chambers R gradually increase in a range (a range on a lower left side in FIG. 2) over approximately 180 degrees in a rotor rotation direction as indicated by an arrow in FIG. 2 from a position (an upper left position in FIG. 2) where the drive rotor 51 and the driven rotor 52 mesh with each other. Meanwhile, in a remaining range (a range on an upper right side in FIG. 2) over approximately 180 degrees, the volumes of the chambers R gradually decrease.

The range in which the volumes of the chambers R gradually increase is an intake range in which the oil is taken in from an inlet port 50c. In the meantime, the range in which the volumes of the chambers R gradually decrease is a discharge range in which the oil is sent out to a discharge port 50d with the oil being pressurized. Note that the inlet port 50c and the discharge port 50d are provided in the recessed portion 50b of the housing 50, such that the inlet port 50c is placed so as to correspond to the intake range, and the discharge port 50d is placed so as to correspond to the discharge range.

The inlet port 50c communicates with an oil strainer via an oil passage (not shown). Note that part of the inlet port 50c is opened outside the adjustment ring 53 and communicates with a low-pressure space TL, which will be described later. Meanwhile, the discharge port 50d communicates with the discharge oil passage 6a through an oil passage 50e formed inside the housing 50.

In the oil pump 5 configured as such, the input shaft 5a is rotated upon receipt of a rotational force of the crankshaft 13, which causes the drive rotor 51 and the driven rotor 52 to rotate while meshing with each other, so that the oil is taken into the chambers R formed therebetween from the inlet port 50c, and then discharged from the discharge port 50d.

The oil pump 5 includes a capacity-variable mechanism that can change a discharge amount per rotation of the input shaft 5a, namely, a pump capacity, by changing a volume of a control space TC. The capacity-variable mechanism is configured to displace the adjustment ring 53 by a hydraulic pressure of the control space TC formed inside the receptacle portion 50a of the housing 50. Due to the displacement of the adjustment ring 53, relative positions of the drive rotor 51 and the driven rotor 52 to the inlet port 50c and the discharge port 50d are changed, so that the pump capacity is changed.

More specifically, the adjustment ring 53 is configured such that a ring-shaped body portion 53a holding the driven rotor 52, an overhanging portion 53b overhanging outwardly from an outer periphery of the body portion 53a, and an arm portion 53c extending further outwardly from the overhanging portion 53b are formed integrally with each other. Due to a pressing force of a coiled spring 54 acting on the arm portion 53c, the adjustment ring 53 is biased to pivot (to be displaced) around the input shaft 5a clockwise in FIG. 2. That is, the coiled spring 54 biases the adjustment ring 53 in a direction where the volume of the control space TC decreases.

A locus of such displacement of the adjustment ring 53 is regulated by guide pins 55, 56 provided in a projecting manner in the recessed portion 50b of the housing 50. That is, arc-shaped elongated holes 53d, 53e are formed in the overhanging portion 53b of the adjustment ring 53 around an axial center of the input shaft 5a, and the guide pins 55, 56 are accommodated therein in a loosely engaged manner. Hereby, the adjustment ring 53 can revolve around the input shaft 5a.

Further, the arm portion 53c of the adjustment ring 53 separates the control space TC and the low-pressure space TL from each other, which are formed side by side in a circumferential direction in the receptacle portion 50a of the housing 50. A first seal material 57 is disposed on a tip end side of the arm portion 53c such that the first seal material 57 makes sliding contact with a peripheral wall of the recessed portion 50b to which the first seal material 57 is opposed. Due to the first seal material 57, flowing of the oil between the control space TC and the low-pressure space TL is limited.

The low-pressure space TL is formed, from a left side to a lower side in the receptacle portion 50a in FIG. 2, in an area surrounded by an outer periphery of the body portion 53a of the adjustment ring 53 and the peripheral wall of the recessed portion 50b. As described above, part of the inlet port 50c is formed so as to be opposed to and opened in the low-pressure space TL, so that the low-pressure space TL communicates with the inlet port 50c.

In the meantime, the control space TC is formed in an area which is surrounded by an outer periphery of the overhanging portion 53b of the adjustment ring 53 and the peripheral wall of the recessed portion 50b and in which flowing of the oil is limited by the first seal material 57 and a second seal material 58. Note that the second seal material 58 is disposed on the outer periphery of the overhanging portion 53b such that the second seal material 58 makes sliding contact with that peripheral wall of the recessed portion 50b to which the second seal material 58 is opposed.

Further, a third seal material 59 is disposed between the peripheral wall of the recessed portion 50b and the adjustment ring 53. These seal materials 57 to 59 are made of a resin material and the like excellent in abrasion resistance, for example.

A round hole 61a is formed in the recessed portion 50b so as to face the control space TC, and the round hole 61a communicates with a control oil passage 61. Hereby, a control hydraulic pressure adjusted by the after-mentioned OCV 60 is supplied to the control space TC. A pressing force to pivot the adjustment ring 53 counterclockwise is applied to the arm portion 53c due to the control hydraulic pressure, so that a position of the adjustment ring 53 is determined according to a relationship between the pressing force and a pressing force (biasing force) of the coiled spring 54.

The adjustment ring 53 is displaced by adjusting the control hydraulic pressure as such, so that a capacity of the oil pump 5 can be controlled. That is, when the control hydraulic pressure is small, the adjustment ring 53 is positioned, by the pressing force of the coiled spring 54, to a maximum pump capacity position as illustrated in FIG. 2. When the control hydraulic pressure increases, the adjustment ring 53 that receives the control hydraulic pressure pivots (is displaced) counterclockwise against the pressing force of the coiled spring 54. Hereby, the pump capacity decreases, and the adjustment ring 53 finally reaches a minimum pump capacity position as illustrated in FIG. 3.

Figure 4:
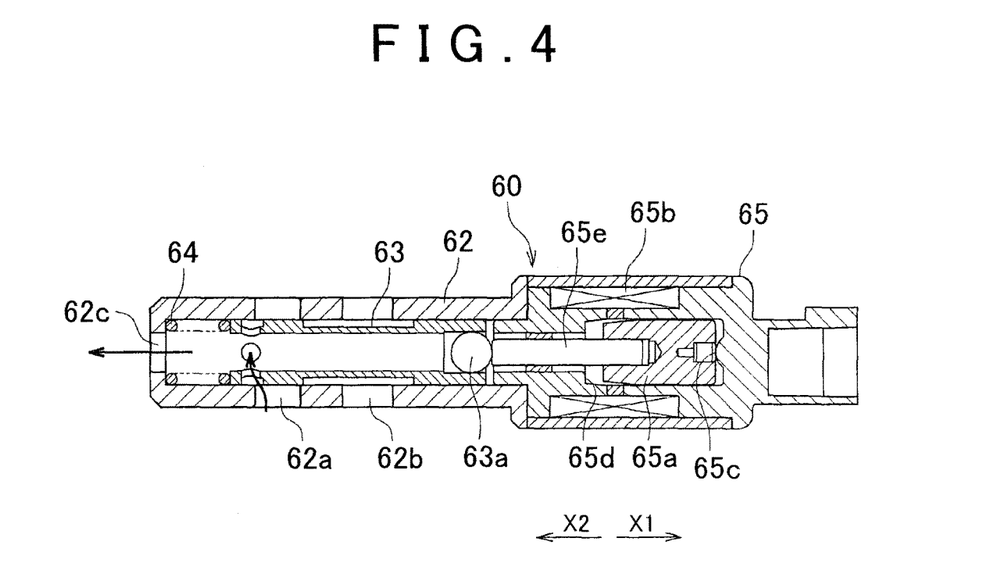
FIG. 4 is a view to describe an OCV for controlling the pump capacity of the oil pump, and is a view illustrating a state where a spool is placed at a moving limit position on one end side.
Figure 5:
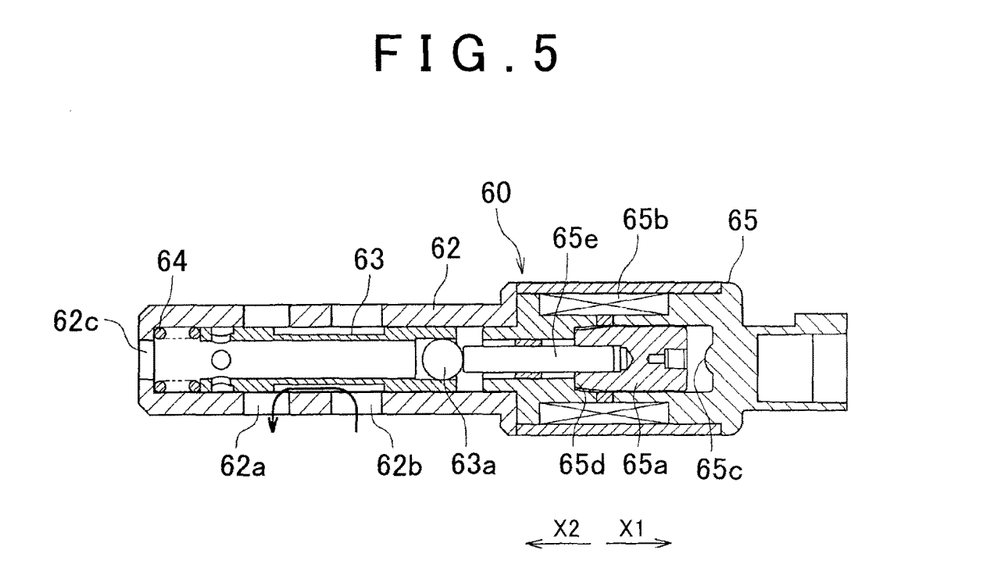
FIG. 5 is a view to describe the OCV for controlling the pump capacity of the oil pump, and is a view illustrating a state where the spool is placed at a moving limit position on the other end side.

Referring now to FIGS. 4 and 5, the following describes the OCV (Oil Control Valve) 60 for adjusting the control hydraulic pressure. Note that the OCV 60 is one example of a "hydraulic pressure control valve" of the present invention.

The OCV 60 includes a spool 63 moving inside a sleeve 62, a coiled spring 64 for biasing the spool 63, and an electromagnetic driving portion 65 for moving the spool 63 against a biasing force of the coiled spring 64. Note that the coiled spring 64 is one example of a "biasing member" of the present invention.

A control port 62a, a supply port 62b, and a discharge port 62c are formed in the sleeve 62. The control port 62a is connected to the control space TC (see FIGS. 2, 3) via the control oil passage 61. The supply port 62b is connected to a supply oil passage 6b (see FIGS. 2, 3) branched from the discharge oil passage 6a of the oil pump 5. Further, the electromagnetic driving portion 65 is provided on one end side (an X1-direction side) of the sleeve 62, and the coiled spring 64 is placed on the other end side (an X2-direction side) of the sleeve 62.

The spool 63 is configured to be movable between one end (an end part on the X1-direction side) and the other end (an end part on the X2-direction side) of the sleeve 62. The spool 63 can switch between a state (a state illustrated in FIG. 4) where the control port 62a communicates with the discharge port 62c and a state (a state illustrated in FIG. 5) where the control port 62a communicates with the supply port 62b. Further, the spool 63 is biased by the coiled spring 64 toward the one end side (the X1-direction side). Hereby, a spherical portion 63a provided in the spool 63 abuts with the after-mentioned rod 65e.

The electromagnetic driving portion 65 includes a plunger 65a, and a solenoid 65b for moving the plunger 65a. The plunger 65a is placed inside the solenoid 65b and is provided so as to be movable between stoppers 65c, 65d. The rod 65e is connected to the plunger 65a, and the spherical portion 63a of the spool 63 abuts with the rod 65e. Because of this, when the plunger 65a is moved, the rod 65e is moved integrally, so that the spool 63 is moved so as to follow the movement of the rod 65e. A Duty signal output from the after-mentioned ECU 100 is supplied to the solenoid 65b, so that a position of the plunger 65a is changed according to a current value. Here, the stoppers 65c, 65d are part of the electromagnetic driving portion 65, and the electromagnetic driving portion 65 is connected to the sleeve 62.

Note that, as illustrated in FIG. 4, when the plunger 65a makes contact with the stopper 65c, the spool 63 is placed at a moving limit position on the one end side (a position where the spool 63 is moved to the endmost on the one end side in the sleeve 62). Meanwhile, as illustrated in FIG. 5, when the plunger 65a makes contact with the stopper 65d, the spool 63 is placed at a moving limit position on the other end side (a position where the spool 63 is moved to the endmost on the other end side in the sleeve 62). Further, the plunger 65a is one example of a "member that moves the spool" in the present invention.

In the OCV 60, in a case where a current value supplied to the solenoid 65b is smaller than a predetermined value, the spool 63 is placed on the one end side by the biasing force of the coiled spring 64, so that the control port 62a communicates with the discharge port 62c. Because of this, the oil flowing back from the control space TC to the control port 62a through the control oil passage 61 flows through an oil passage inside the OCV 60 as illustrated in FIG. 4, and then is discharged (drained) from the discharge port 62c.

On the other hand, in a case where the current value supplied to the solenoid 65b is larger than the predetermined value, an electro-magnetic force generated by the solenoid 65b becomes large, so that the spool 63 is moved toward the other end side against the biasing force of the coiled spring 64. Hereby, the control port 62a communicates with the supply port 62b. Because of this, the oil supplied from the oil pump 5 to the supply port 62b through the supply oil passage 6b flows through the oil passage inside the OCV 60 as illustrated in FIG. 5, and then is sent out to the control oil passage 61 from the control port 62a. When a position of the spool 63 changes in a state where the control port 62a communicates with the supply port 62b, a sectional area of the oil passage changes, so that a pressure of the oil sent out from the control port 62a, namely, the control hydraulic pressure is changed.

Figure 6:
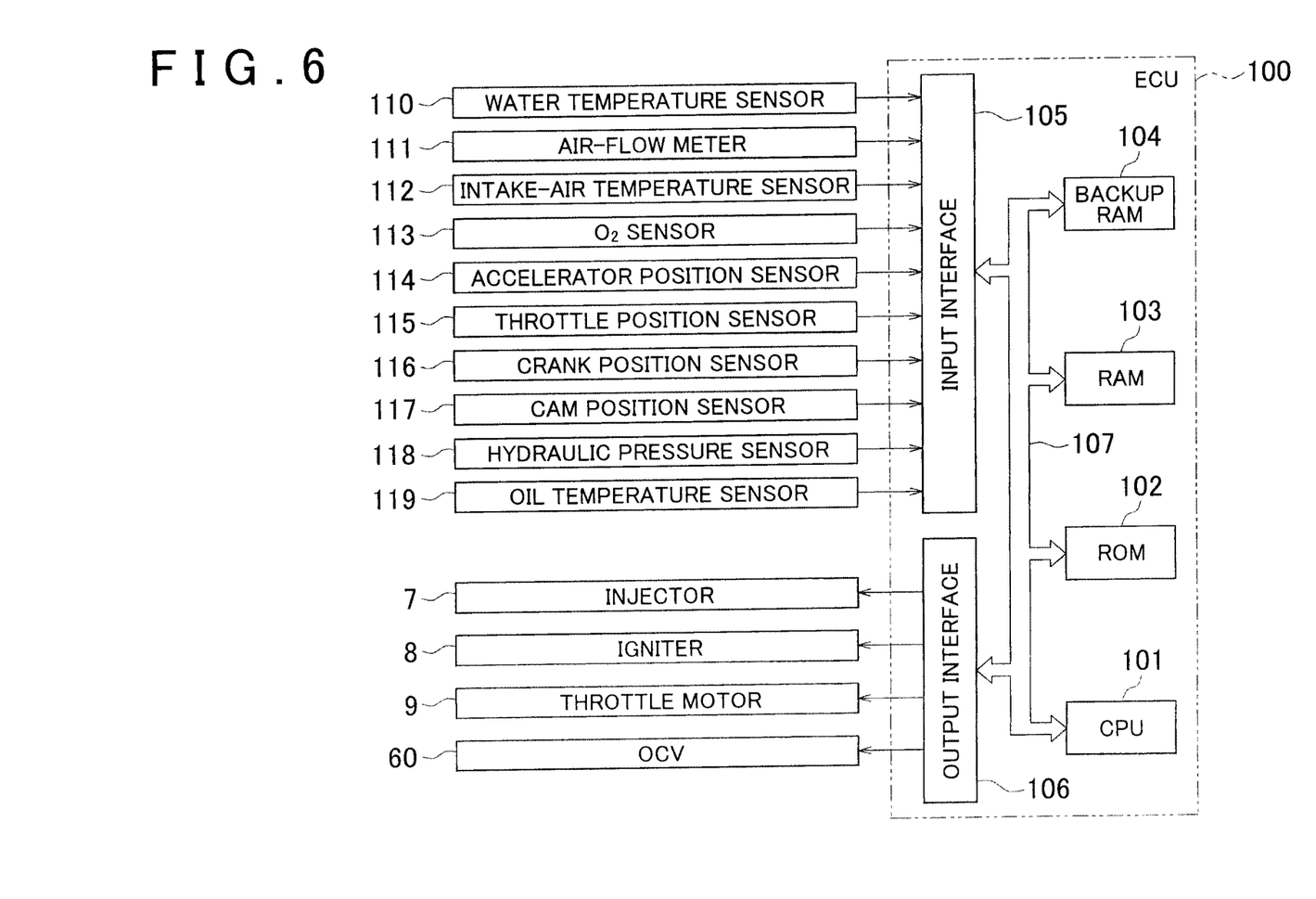
FIG. 6 is a block diagram illustrating a schematic configuration of an ECU for controlling the engine.

Referring now to FIG. 6, the following describes the ECU 100 that controls the engine 1. Note that the ECU 100 is one example of an electronic control unit of the present invention.

The ECU 100 of the present embodiment includes a CPU 101, an ROM 102, an RAM 103, a backup RAM 104, an input interface 105, an output interface 106, and a bus 107 for connecting them to each other.

The CPU 101 executes computing processes based on various control programs and maps stored in the ROM 102. The ROM 102 stores therein various control programs, maps to be referred to when such various control programs are executed, and the like. The RAM 103 is a memory in which to temporarily store computing results by the CPU 101, detection results of various sensors, and the like. The backup RAM 104 is a nonvolatile memory in which to store data and the like to be stored when ignition is turned off.

The input interface 105 is connected to a water temperature sensor 110 for detecting a coolant temperature of the engine 1, an air-flow meter 111 for measuring an intake-air amount, an intake-air temperature sensor 112 for measuring an intake-air temperature, an $O_2$ sensor 113 provided in an exhaust system, an accelerator position sensor 114 for detecting an accelerator opening degree, a throttle position sensor 115 for detecting an opening degree of a throttle valve, a crank position sensor 116 for detecting a rotation position of the crankshaft 13, a cam position sensor 117 for detecting a rotation position of the camshaft 14, a hydraulic pressure sensor 118 for detecting a hydraulic pressure (an actual discharge hydraulic pressure) in the main gallery 20, an oil temperature sensor 119 for detecting an oil temperature in the main gallery 20, and the like.

The output interface 106 is connected to an injector 7, an igniter 8 of an ignition plug, a throttle motor 9 of the throttle valve, the OCV 60 of the oil pump 5, and the like. The ECU 100 is configured to be able to control an operating state of the engine 1 by controlling an opening degree (an intake-air amount) of the throttle valve, a fuel injection amount, and an ignition timing, and the like based on detection results of respective sensors.

Further, the ECU 100 controls a discharge hydraulic pressure of the oil pump 5 according to the operating state and the like of the engine 1, and also controls a pump capacity by the OCV 60 so as to achieve the discharge hydraulic pressure thus controlled. More specifically, the ECU 100 calculates a request discharge hydraulic pressure to be request to the oil pump 5 by performing feedback control based on a deviation between a target discharge hydraulic pressure of the oil pump 5 and an actual discharge hydraulic pressure that is actually discharged from the oil pump 5. The ECU then generates a Duty signal that causes the oil pump 5 to output the request discharge hydraulic pressure, and supplies the Duty signal to the OCV 60. This makes it possible to restrain, to the minimum, a necessary power (a power received from the engine 1) for the oil pump 5 to discharge the oil, and to improve a specific fuel consumption of the engine 1.

Here, in the OCV 60 for controlling the pump capacity, foreign matter (chips or the like at the time of cutting work) mixed in the oil may be stuck on the spool 63. When the foreign matter is stuck on the spool 63 as such, the spool 63 malfunctions, which makes it difficult to control the control hydraulic pressure appropriately. In view of this, the ECU 100 of the present embodiment is configured to perform a foreign-matter removal control when foreign matter is stuck during execution of the after-mentioned hydraulic-pressure control.

Figure 7:
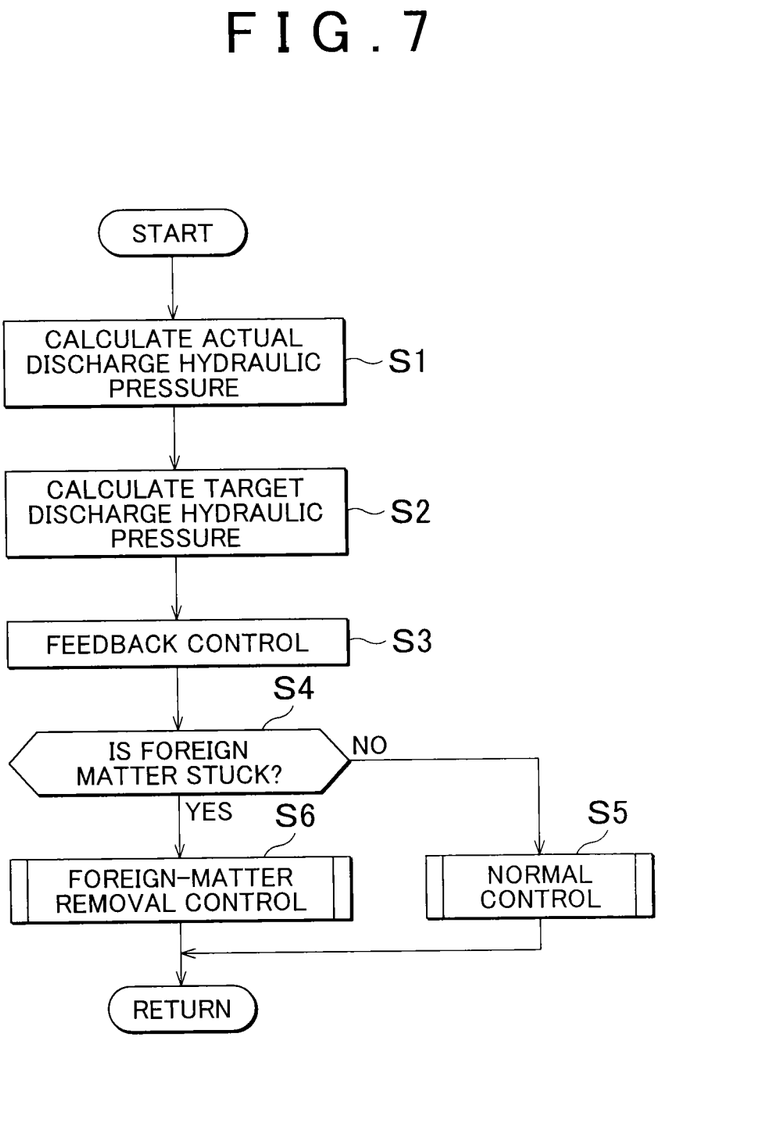
FIG. 7 is a flow chart illustrating an example of that hydraulic-pressure control on the oil pump which is executed by the ECU.

Referring now to FIG. 7, the following describes a hydraulic-pressure control of the oil pump 5, which is executed by the ECU 100. Note that the following flow is repeatedly executed by the ECU 100 at every predetermined time interval.

First, in step S1, an actual discharge hydraulic pressure that is actually discharged from the oil pump 5 is calculated. The actual discharge hydraulic pressure is a hydraulic pressure in the main gallery 20, which is detected by the hydraulic pressure sensor 118, for example.

Then, in step S2, a target discharge hydraulic pressure is calculated based on the number of revolutions and a load factor of the engine 1.

Then, in step S3, feedback control is performed based on the target discharge hydraulic pressure and the actual discharge hydraulic pressure, so that a request discharge hydraulic pressure to be requested to the oil pump 5 is calculated.

Then, in step S4, it is determined whether foreign matter is stuck or not. Note that whether foreign matter is stuck or not is determined based on the target discharge hydraulic pressure and the actual discharge hydraulic pressure. More specifically, when a predetermined period passes in a state where a divergence amount between the target discharge hydraulic pressure and the actual discharge hydraulic pressure becomes a predetermined value or more, it is determined that foreign matter is stuck. When it is determined that foreign matter is not stuck, the after-mentioned normal control is performed in step S5, and then, the process shifts to a return. In the meantime, when it is determined that foreign matter is stuck, the after-mentioned foreign-matter removal control is performed in step S6, and then, the process shifts to a return.

In the normal control, the OCV 60 is controlled so that the oil pump 5 outputs a request discharge hydraulic pressure. That is, a Duty signal is calculated so that the oil pump 5 has a pump capacity that allows the oil pump 5 to output the request discharge hydraulic pressure, and the Duty signal is supplied to the OCV 60.

Figure 8:
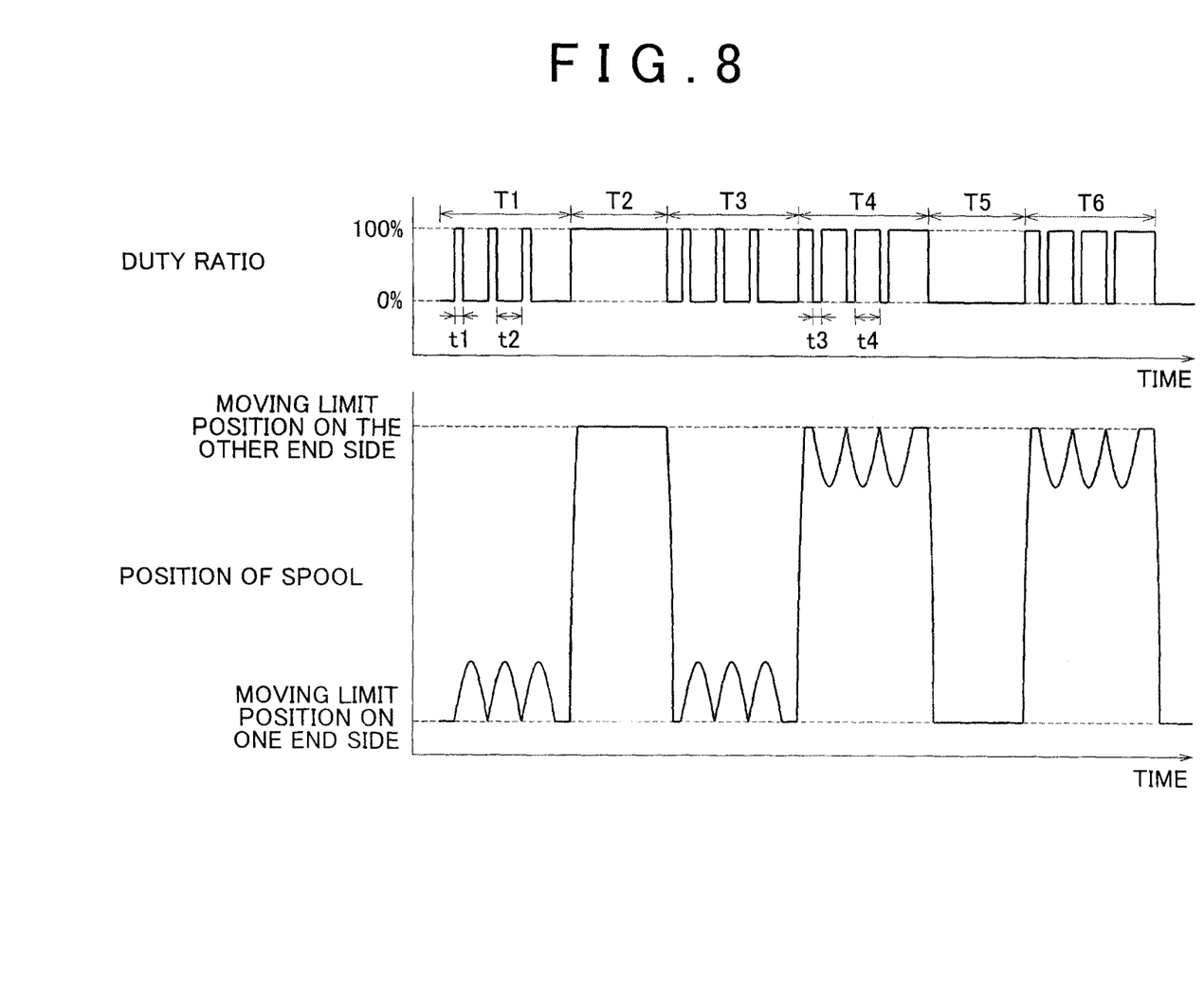
FIG. 8 is a time chart illustrating an example of a foreign-matter removal control executed by the ECU.

Referring now to FIG. 8, the following describes the foreign-matter removal control by the ECU 100 of the present embodiment. FIG. 8 illustrates a Duty signal (a duty ratio) output from the ECU 100 to the OCV 60 in the foreign-matter removal control, and a position of the spool 63 when the Duty signal is supplied. Note that clogging of foreign matter (stuck of foreign matter) may occur in various parts, so FIG. 8 exemplifies a case where the spool 63 is moved according to the Duty signal to be supplied, without being clogged up with foreign matter. That is, it may be said that the position of the spool 63 illustrated in FIG. 8 is an indicated value (a command value) of the spool 63 according to the Duty signal supplied at the time of the foreign-matter removal control.

Here, stuck of foreign matter mixed in the oil includes the following cases: a case where the foreign matter is stuck when the spool 63 moves from one end side to the other end side (the X2-direction side in FIG. 4) in the sleeve 62 (hereinafter referred to as "stuck in a forward path"); and a case where the foreign matter is stuck when the spool 63 moves from the other end side to the one end side (the X1-direction side in FIG. 5) in the sleeve 62 (hereinafter referred to as "stuck in a return path"). In view of this, the ECU 100 of the present embodiment is configured to perform controls for respective cases alternately so as to be able to remove the foreign matter in either case. More specifically, for the purpose of removing the foreign matter at the time of stuck in the forward path, a control from periods T1 to T3 in FIG. 8 is performed, and for the purpose of removing the foreign matter at the time of stuck in the return path, a control from periods T4 to T6 in FIG. 8 is performed.

First, in the first period T1, the spool 63 is controlled to vibrate in one end of the sleeve 62. More specifically, a Duty signal supplied from the ECU 100 to the OCV 60 repeatedly performs a combination of a duty ratio of 100% for a time t1 with a duty ratio of 0% for a time t2 after the time t1. Note that the time t1 indicates a short time (e.g., 8 ms), and the time t2 indicates a long time (e.g., 24 ms) as compared with the time t1. That is, the times t1 and t2 have different lengths, and the Duty signal is a pulse signal in which an off period is longer than an on period. Further, FIG. 8 exemplifies a case where the above combination is repeated three times, but may be repeated any number of times.

When such a Duty signal is supplied, the plunger 65a repeatedly performs separation from the stopper 65c and returning (collision) to the stopper 65c. Hereby, in a case of the stuck in the forward path, the spool 63 can move toward the one end, so that the spool 63 vibrates in the one end so as to follow the plunger 65a. That is, the spool 63 repeatedly performs separation from a moving limit position on the one end side and returning to the moving limit position. Note that a moving distance (a separation distance from the moving limit position) of the spool 63 at this time is smaller than a movable distance (a distance between the moving limit position on the one end side and a moving limit position on the other end side) of the spool 63. Accordingly, in a case of the stuck in the forward path, in the period T1, the vibrations of the spool 63 and the plunger 65a are transmitted to the sleeve 62, so that the spool 63 is controlled to shake the foreign matter in the OCV 60 from a part to which the foreign matter is attached. Note that, in a case of the stuck in the return path, the spool 63 is in a state to crush the foreign matter due to the biasing force of the coiled spring 64 in the period. T1

After that, in the second period T2, the spool 63 is controlled to move to the other end of the sleeve 62. More specifically, a Duty signal supplied from the ECU 100 to the OCV 60 is maintained at a duty ratio of 100% for a predetermined time. Note that the predetermined time indicates a long time (e.g., 300 ms) as compared with the time t1.

When such a Duty signal is supplied, the plunger 65a is moved from the stopper 65c toward a stopper-65d side (the X2-direction side in FIG. 4), so that the spool 63 is moved to the other end side. Hereby, in a case of the stuck in the forward path, the spool 63 is controlled in the period T2 such that the spool 63 is pressed against the foreign matter so as to crush the foreign matter. Note that, in a case of the stuck in the return path, cutting off of the foreign matter is cancelled in the period T2.

After that, in the period T3, the spool 63 is controlled to vibrate in the one end of the sleeve 62, similarly to the period T1.

Then, in the period T4, the spool 63 is controlled to vibrate in the other end of the sleeve 62. More specifically, a Duty signal supplied from the ECU 100 to the OCV 60 repeatedly performs a combination of a duty ratio of 0% for a time t3 with a duty ratio of 100% for a time t4 after the time t3. Note that the time t3 indicates a short time (e.g., 8 ms), and the time t4 indicates a long time (e.g., 24 ms) as compared with the time t3. That is, the times t3 and t4 have different lengths, and the Duty signal is a pulse signal in which an on period is longer than an off period. Further, FIG. 8 exemplifies a case where the above combination is repeated three times, but may be repeated any number of times.

When such a Duty signal is supplied, in a case of the stuck in the return path, the spool 63 can move to the other end, and the plunger 65a repeatedly performs separation from the stopper 65d and returning (collision) to the stopper 65d. Hereby, the spool 63 vibrates in the other end so as to follow the plunger 65a. That is, the spool 63 repeatedly performs separation from the moving limit position on the other end side and returning to the moving limit position. Note that a moving distance of the spool 63 at this time is smaller than the movable distance of the spool 63. Accordingly, in a case of the stuck in the return path, in the period T4, the vibrations of the spool 63 and the plunger 65a are transmitted to the sleeve 62, so that the spool 63 is controlled to shake the foreign matter in the OCV 60 from a part to which the foreign matter is attached. Note that, in a case of the stuck in the forward path, the spool 63 is to crush the foreign matter by the plunger 65a that is to move toward the stopper-65d side in the period T4.

After that, in the period T5, the spool 63 is controlled to move to the one end of the sleeve 62. More specifically, a Duty signal supplied from the ECU 100 to the OCV 60 is maintained at a duty ratio of 0% for a predetermined time.

Note that the predetermined time indicates a long time (e.g., 300 ms) as compared with the time t3.

When such a Duty signal is supplied, the plunger 65a is moved toward a stopper-65c side (the X1-direction side in FIG. 5), so that the spool 63 is moved to the one end side by the biasing force of the coiled spring 64. Hereby, in a case of the stuck in the return path, the spool 63 is controlled in the period T5 such that the spool 63 is pressed against the foreign matter so as to crush the foreign matter. Note that, in a case of the stuck in the forward path, cutting off of the foreign matter is cancelled in the period T5.

After that, in the period T6, the spool 63 is controlled to vibrate in the other end of the sleeve 62, similarly to the period T4.

In the present embodiment, by controlling the spool 63 to vibrate in the one end or the other end when foreign matter is stuck, the plunger 65a for moving the spool 63 repeatedly collides with the stopper 65c or 65d as described above. The stopper 65c or 65d is part of the electromagnetic driving portion 65, and the electromagnetic driving portion 65 is connected to the sleeve 62. Accordingly, the vibration of the spool 63 is transmitted to the sleeve 62 via the stopper 65c or 65d. As a result, it is possible to shake the foreign matter in the OCV 60 from a part to which the foreign matter is attached. The foreign matter is then discharged with the oil. Thus, the foreign matter can be removed even if the foreign matter cannot be crush. Further, in a case where the foreign matter cannot be crush, if the control to crush the foreign matter is performed repeatedly, the foreign matter might be pushed between the sleeve 62 and the spool 63. However, in the present embodiment, the foreign matter is shaken off to be removed, thereby making it possible to restrain occurrence of the pushing of the foreign matter.

Further, in the present embodiment, when foreign matter is stuck, the spool 63 is controlled to vibrate in the one end, and the spool 63 is controlled to vibrate in the other end of the sleeve 62. At the time when the spool 63 moves toward the one end side, if foreign matter is stuck and the spool 63 cannot move to the one end, the spool 63 is vibrated in the other end. Meanwhile, at the time when the spool 63 moves toward the other end side, if foreign matter is stuck and the spool 63 cannot move to the other end, the spool 63 can be vibrated in the one end. Hereby, regardless of a moving direction of the spool 63 at the time when foreign matter is stuck, the foreign matter can be shaken off. Accordingly, it is possible to improve foreign-matter removal performance.

Further, in the present embodiment, by repeatedly performing the combination of a duty ratio of 100% for the time t1 with a duty ratio of 0% for the time t2 after the time t1, it is possible to control the spool 63 to vibrate in the one end. Further, by repeatedly perform the combination of a duty ratio of 0% for the time t3 with a duty ratio of 100% for the time t4 after the time t3, it is possible to control the spool 63 to vibrate in the other end.

Further, in the present embodiment, in a case where the foreign matter can be crush, a control to crush the foreign matter is performed, so that the foreign matter can be easily removed. That is, by alternately performing a control to shake off the foreign matter and the control to crush the foreign matter, the foreign-matter removal performance can be improved.

Further, in the present embodiment, since the foreign matter in the OCV 60 can be removed, it is possible to restrain such a problem that a pump capacity of the oil pump 5 cannot be controlled due to stuck of the foreign matter.

It should be noted that the embodiment described herein is just an example in all respects and is not limitative. Accordingly, the technical scope of the present invention is not interpreted only by the above embodiment, but is defined based on the description in Claims. The technical scope of the present invention includes all modifications made within the meaning and scope equivalent to Claims.

For example, the present embodiment deals with an example in which the present invention is applied to the ECU 100 that controls the OCV 60 for controlling the pump capacity of the oil pump 5. However, the present invention is not limited to this, and may be applied to an ECU that controls an OCV for controlling opening and closing timings of intake and exhaust valves.

Further, the present embodiment deals with an example in which no stopper is provided at the moving limit position of the spool 63 on the one end side. However, the present invention is not limited to this, and a stopper (not shown) may be provided at a moving limit position of a spool on one end side. In this case, when the spool vibrates in one end, the spool may collide with the stopper repeatedly. The same can be applied to the moving limit position of the spool 63 on the other end side.

Further, in the present embodiment, the spool 63 is controlled to vibrate in the one end or the other end, so that the plunger 65a repeatedly collides with the stopper 65c or 65d. However, the present invention is not limited to this. A spool may be controlled to vibrate in one end or the other end, so that a rod for moving the spool may collide with a stopper repeatedly.

Further, the foreign-matter removal control exemplified in the present embodiment is such that the control to shake off the foreign matter (the periods T1, T3, T4, and T6) and the control to crush the foreign matter (the periods T2 and T5) are performed alternately. However, the present invention is not limited to this, and only the control to shake off the foreign matter may be performed without performing the control to crush the foreign matter. For example, a control to vibrate the spool 63 in the one end and a control to vibrate the spool 63 in the other end may be performed alternately.

Further, in the foreign-matter removal control in the present embodiment, the control from the periods T1 to T6 may be performed only once, or the control from the periods T1 to T6 may be performed several times.

Further, the present embodiment deals with an example in which the spool 63 is controlled to vibrate in the one end, and the spool 63 is controlled to vibrate in the other end. However, the present invention is not limited to this, and a spool may be controlled to vibrate only in either one end or the other end.

Further, in the present embodiment, after the foreign-matter removal control is performed, it is determined whether the foreign matter is removed or not, and if the foreign matter is not removed, the engine 1 may be stopped. Further, in a case where the foreign matter is not removed even if the foreign-matter removal control is performed, the foreign-matter removal control is performed several times, and when the foreign matter is still not removed even if an execution number of times of the foreign-matter removal control exceeds a predetermined number of times, the engine 1 may be stopped.

Further, the present embodiment deals with an example in which the engine 1 is an in-line four-cylinder gasoline engine. However, the present invention is not limited to this. The engine may be a diesel engine, and the number of cylinders of the engine and a type (a V type or a horizontal opposed type) of the engine are not limited in particular.

Further, the present embodiment deals with an example in which the oil pump 5 is an internal gear pump. However, the present invention is not limited to this, and the oil pump may be a vane pump or a piston pump.

The present invention is usable in that control system of a hydraulic pressure control valve which controls a hydraulic pressure control valve including a spool that moves in a sleeve.

What is claimed is:

1. A control system comprising:
   a hydraulic pressure control valve including a spool configured to be moved inside a sleeve, the hydraulic pressure control valve being configured to control a hydraulic pressure by moving the spool between a first end and a second end of the sleeve, the hydraulic pressure control valve including a stopper configured to transmit vibration to the sleeve; and
   an electronic control unit configured to control the spool to vibrate in the first end or the second end when foreign matter is stuck in the hydraulic pressure control valve, by controlling a member that moves the spool to repeatedly hit the stopper without, between repeated hits of the member that moves the spool with the stopper, the spool returning to an opposite end to the first or second end in which spool vibrates.

2. The control system according to claim 1, wherein the electronic control unit is configured to control the spool such that the spool vibrates alternately in the first end and in the second end, when the foreign matter is stuck in the hydraulic pressure control valve.

3. The control system according to claim 1, wherein the electronic control unit is configured to control a pump capacity of a variable-capacity oil pump by controlling the hydraulic pressure control valve, and the electronic control unit is configured to determine whether the foreign matter is stuck or not, based on a target discharge hydraulic pressure of the variable-capacity oil pump and an actual discharge hydraulic pressure actually discharged from the variable-capacity oil pump.

4. The control system according to claim 1, wherein the stopper is a part of an electromagnetic driving structure that is connected to the sleeve.

5. The control system according to claim 1, wherein the member that moves the spool is a plunger.

6. The control system according to claim 1, wherein the hydraulic pressure control valve includes a supply port, a control port, and a discharge port, and
   the control port communicates with the discharge port when the spool is at the first end of the sleeve, and
   the supply port communicates with the control port when the spool is at the second end of the sleeve.

7. The control system according to claim 1, wherein the hydraulic pressure control valve includes:
   a biasing member configured to bias the spool toward a first end side; and
   a solenoid configured to move the spool toward a second end side against a biasing force of the biasing member, and
   the electronic control unit is configured to control the spool to vibrate by adjusting a current application time to the solenoid.

8. The control system according to claim 7, wherein the biasing member is a spring.

* * * * *